US008607094B2

(12) United States Patent
Choi et al.

(10) Patent No.: US 8,607,094 B2
(45) Date of Patent: Dec. 10, 2013

(54) OPERATIONAL SYSTEM TEST METHOD

(75) Inventors: Byoung Ju Choi, Seoul (KR); Joo Young Seo, Seoul (KR); Seung Wan Yang, Gyeonggi-Do (KR); Hae Young Kwon, Gyeonggi-Do (KR)

(73) Assignees: Hyundai Motor Company, Seoul (KR); Kia Motors Corporation, Seoul (KR); Ehwa University-Industry Collaboration Foundation, Seoul (KR)

( * ) Notice: Subject to any disclaimer, the term of this patent is extended or adjusted under 35 U.S.C. 154(b) by 340 days.

(21) Appl. No.: 12/838,874

(22) Filed: Jul. 19, 2010

(65) Prior Publication Data
US 2011/0078507 A1    Mar. 31, 2011

(30) Foreign Application Priority Data

Sep. 29, 2009  (KR) .................. 10-2009-0092272
Jun. 28, 2010  (KR) .................. 10-2010-0061455

(51) Int. Cl.
G06F 11/00  (2006.01)

(52) U.S. Cl.
USPC ............... 714/25; 714/26; 714/35; 714/38.1; 714/38.11; 714/48; 717/127

(58) Field of Classification Search
USPC ............... 714/25, 26, 35, 38.1, 38.11, 48; 717/127
See application file for complete search history.

(56) References Cited

U.S. PATENT DOCUMENTS

| | | | |
|---|---|---|---|
| 6,643,769 B1 * | 11/2003 | Huck et al. ............... | 712/227 |
| 6,874,139 B2 * | 3/2005 | Krueger et al. ........... | 717/127 |
| 7,000,224 B1 * | 2/2006 | Osborne et al. .......... | 717/125 |
| 7,171,464 B1 * | 1/2007 | Raghuraman et al. .... | 709/224 |
| 7,316,014 B2 * | 1/2008 | Cao .......................... | 717/169 |
| 7,334,166 B1 * | 2/2008 | Rhea et al. ............... | 714/46 |
| 7,337,365 B2 * | 2/2008 | Zunino et al. ............ | 714/38.11 |
| 7,380,235 B1 * | 5/2008 | Fathalla ................... | 717/109 |
| 7,392,527 B2 * | 6/2008 | Callender ................. | 719/327 |
| 7,523,198 B2 * | 4/2009 | Wu et al. .................. | 709/224 |
| 7,552,479 B1 * | 6/2009 | Conover et al. .......... | 726/24 |
| 7,735,138 B2 * | 6/2010 | Zhao ........................ | 726/24 |
| 7,757,215 B1 * | 7/2010 | Zhou et al. ............... | 717/124 |
| 7,904,886 B2 * | 3/2011 | Dufour et al. ............ | 717/124 |
| 7,996,686 B2 * | 8/2011 | LeGendre et al. ........ | 713/189 |
| 8,171,548 B2 * | 5/2012 | Mantripragada et al. . | 726/22 |
| 2005/0149947 A1 * | 7/2005 | Callender ................. | 719/321 |
| 2006/0150017 A1 * | 7/2006 | Mihara ..................... | 714/25 |

(Continued)

FOREIGN PATENT DOCUMENTS

KR    1020060059759    6/2006
KR    2007-0087400 A    8/2007

OTHER PUBLICATIONS

Jeong-Hyuk Yoon et al., A Study on Anomaly Detection Based on Users Command Analysis, 2000—Abstract Only.

Primary Examiner — Joshua P Lottich
(74) Attorney, Agent, or Firm — Edwards Wildman Palmer LLP; Peter F. Corless

(57) ABSTRACT

The present invention features an operational system test method, comprising defining a fault model, inserting a test agent, hooking a test location, collecting test information, and removing the test agent. The invention also features an operational system test method, comprising defining a fault model, inserting a test agent, identifying a memory area according to a test location, hooking the identified memory area, collecting test information, and removing the test agent.

13 Claims, 6 Drawing Sheets

(56) References Cited

U.S. PATENT DOCUMENTS

| | | |
|---|---|---|
| 2006/0161985 A1* | 7/2006 | Zhao ................................ 726/24 |
| 2006/0271825 A1* | 11/2006 | Keaffaber et al. .............. 714/38 |
| 2007/0220492 A1* | 9/2007 | Brugiolo et al. .............. 717/126 |
| 2007/0234295 A1* | 10/2007 | Dufour et al. ................. 717/124 |
| 2008/0276260 A1* | 11/2008 | Garlick et al. ................ 719/328 |
| 2009/0100420 A1* | 4/2009 | Sapuntzakis et al. ......... 717/171 |
| 2009/0164976 A1* | 6/2009 | Gritter et al. .................. 717/127 |
| 2009/0249368 A1* | 10/2009 | Needamangala et al. .... 719/328 |
| 2010/0037100 A1* | 2/2010 | Lopian ............................ 714/35 |
| 2011/0022899 A1* | 1/2011 | Greenberg et al. ............. 714/47 |
| 2011/0029805 A1* | 2/2011 | Pericin .............................. 714/2 |

\* cited by examiner

OPERATIONAL SYSTEM TEST METHOD

CROSS-REFERENCE TO RELATED APPLICATION

This application claims under 35 U.S.C. §119(a) the benefit of Korean Patent Application No. 10-2009-0092272 filed on Sep. 29, 2009 and No. 10-2010-0061455 filed on Jun. 28, 2010, the entire contents of which are incorporated herein by reference.

BACKGROUND OF THE INVENTION

Generally the technology of 'IT fusion,' that the IT technology is grafted on the traditional industry has been rapidly developing, and IT fusion is used in various industries, such as health care-IT, vehicle-IT, aviation-IT, and construction-IT as a way to strengthen competitiveness. IT grafting in the medical field was initiated so as to minimize medical malpractice in operation. For example, research related to the "remote robot visual guidance system" has been well developed, where this system provides quick and accurate video information while a minute operation is performed by a robot instead of a human medical doctor.

In the case of the automobile field, IT fusion has attempted to develop intelligent vehicles based on telematics, the navigation and location based service (LBS), and the Human Machine Interface (HMI). When considering system in the IT fusion industry, the operation of the interaction situation in the operation environment of the fusion system is more important than the independent operation of the system. Moreover, since confirmation of the operation through system itself is relatively limited, an operation having an input with real data in a live environment is an important consideration, and the system test in online operation time is also an important consideration. In particular, the system operational time requires a test which is able to discover a latent fault which is generated while running a system for a long time or a fault which causes a system down. There remains a need in the art for improved system test methods.

The above information disclosed in this the Background section is only for enhancement of understanding of the background of the invention and therefore it may contain information that does not form the prior art that is already known in this country to a person of ordinary skill in the art.

SUMMARY OF THE INVENTION

The present invention features an operational system test method for obtaining test information to suitably identify the fault in a system and the location.

The test method of the present invention relates to test an operation system.

Additionally, the test method of the present invention relates to test software in the system.

Finally, the test method of the present invention relates to test embedded software in the system.

In certain embodiments, an operational system test method of the present invention includes defining a fault model; inserting a test agent; hooking a test location; collecting test information; and removing the test agent.

In related embodiments, defining a fault model includes suitably defining the test location and test information according to a fault type; suitably defining the test location and test information according to the fault type; and suitably generating a test code for collecting the test information.

According to the present invention, inserting a test agent includes suitably configuring a list for a process which is operating; and suitably inserting the test agent based on the list.

In the embodiments, hooking a test location includes suitably identifying a memory area according to the test location; and suitably hooking the identified memory area with the test code.

Collecting test information includes collecting program execution information, process context information and system status information.

Removing the test agent includes suitably restoring the test location; and removing the test agent.

In accordance with another embodiment of the present invention, an operational system test method includes suitably defining a fault model; suitably inserting a test agent; suitably identifying a memory area according to a test location; suitably hooking the identified memory area; suitably collecting test information; and suitably removing the test agent.

In further related embodiments, defining a fault model includes suitably defining the test location according to a fault type; suitably defining the test information according to the fault type; and suitably generating a test code for collecting the test information.

Hooking the identified memory area includes hooking the identified memory area with the test code.

In further exemplary embodiments, in case the test location, function tables such as APISet area and Import Address Table (IAT) and a code space area of process control block (PCB) is hooked. In further exemplary embodiments, in case the test information, process running information such as program execution information and process context information of PCB is hooked.

The operational system test method of the present invention has an advantage in that the test for all processes and dynamic situations is possible while the actual system operates since a specific memory space is hooked in the state where the system is booted and all images are uploaded to the memory.

Additionally, the system test method according to prior art stores essential execution information for the current process and the thread which are currently executing into process control block (PCB) for the process management, even though many processes operated in the system exist.

The operational system test method of the present invention can suitably minimize the system overhead due to test by using the hooking technique suitably utilizing the program context information of PCB not using the individual code insertion for all programs, based on operating system.

The operational system test method of the present invention can suitably acquire test information for the discovery and recovery of fault in the operational system test in which 'run-time, real-time, and resources' restriction is severe, by applying the profiling technology used for the measure of system performance to test.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

Figure 1:
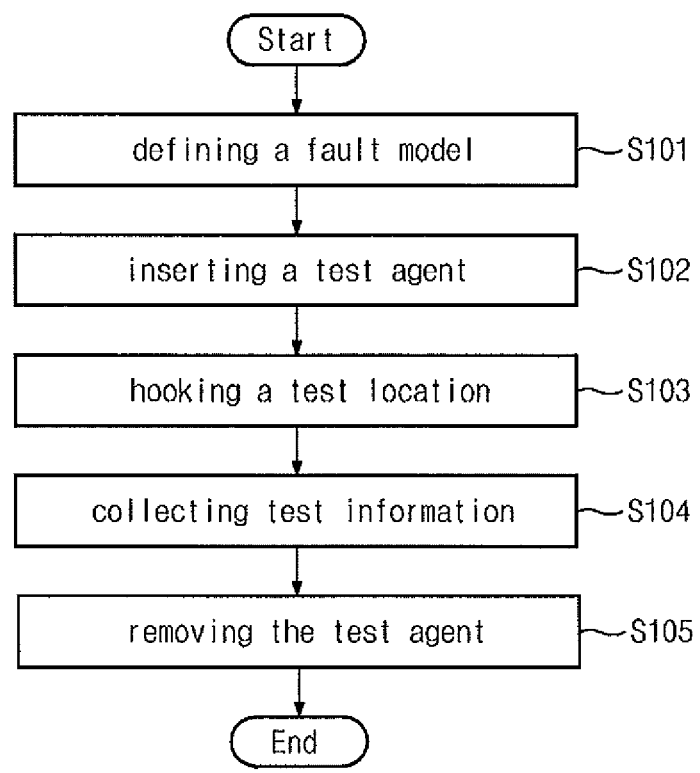
FIG. 1 is a flowchart showing the operational system test method according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE EMBODIMENTS

The present invention features, in aspects, an operational system test method, comprising defining a fault model, inserting a test agent, hooking a test location, collecting test information, and removing the test agent.

In one embodiment, defining a fault model comprises defining the test location according to a fault type, defining the test information according to the fault type, and generating a test code for collecting the test information.

The invention also features in another aspect an operational system test method, comprising defining a fault model, inserting a test agent, identifying a memory area according to a test location, hooking the identified memory area, collecting test information, and removing the test agent.

Hereinafter, exemplary embodiments of the present invention will be described in detail with reference to the attached drawings.

The term "operational" is meant to refer to the state where the function or the service of system is in the actual operation or the state where the request to system can be immediately used. In embodiments, operational system test is meant to refer to the system test in the environment where the system is distributed and installed and actually operated. The term "run-time" is meant to refer to the dynamic situation of operating during the driving of system. In embodiments, "run time" is meant to refer to operating during when from the start of system and to the end of the system which can be suitably compared with the compile time.

According to certain embodiments, the activity in run-time includes not only the simple execution of program but also various dynamic behaviors such as dynamic connection situation which loads system components related to the execution of program and integrates it, the multi-thread operation, and the shared resource management among processes or threads. In further embodiments, real-time means a situation where a system or a certain operation mode immediately processes the request of an external process and suitably returns the result within a given time.

The term "hooking" is meant to refer to a programming technique that suitably snatches the operation and control method of system in the execution time and suitably changes it into a desired way for a specific purpose. According to certain embodiments, the hooking technology is used to generate an update program for suitably improving or modifying a trivial bug of a system product which is already widely distributed like patch, or, sometimes, misused as a technology which approaches data information of other person and collects or modifies it without the consent of users, for example like spyware.

In certain embodiments of the present invention, when the hooking technology can be used for looking into the system and software in the system. The hooking is a kind of an implement for changing code, and it can be suitably classified into a static method and a dynamic method according to the point of time of code insertion. The static method is a method of changing the original copy code by adding a preset test code to a source code or a binary code before program runs, that is, in a compile time. Therefore, in a program to which the test code is statically inserted, the test is always performed in run-time in a fixed mode, and the memory, the resource overhead of CPU are constantly consumed during a system life cycle. Further, it is insufficient for the static method to be applied to on line test because it is not easy to consider the dynamic situation like DLL connection.

The dynamic method is a method of inserting the test code into run-time. In certain exemplary embodiments, when compared with the static method, the dynamic method can be considered to be more suitable method for on line test because that the dynamic situation grasped in run-time can be tested. The on-line system test method of the present invention means the hooking of the dynamic method, and the hooking object is a binary code which is suitably mounted in the system not in source code and actually operated so as to make the final distribution code to be object.

Accordingly, in certain embodiments according to the present invention, since the operational system test refers to a test for all programs operating in the system, not a test for a specific one program operating in the system, the PCB-hooking concept is suitably applied based on the operating system which manages and operates all programs operating in the system, not hooking for a specific program. Profiling, as used herein, is meant to refer to the performance analyzing technique for measuring the program behavior or the system status in run-time. Since profiling is used to optimize system, it is important to suitably measure the performance of the system and find the performance bottleneck section.

According to certain embodiments, the present invention utilizes profiling for the collection of test information with respect to the fault discovered through test, while the collection of test information is used to suitably determine the program of system which caused the problem, to suitably determine the part within the program related to the problem, and to determine the reason of the fault.

Hereinafter, an exemplary embodiment of the present invention is illustrated in detail with reference to the attached drawings FIG. 1 is a flowchart of operational system test method according to an exemplary embodiment of the present invention.

In an embodiment, and referring to FIG. 1, the operational system test method of the present invention is started. The operational system test method defines a fault model (S101). According to embodiments, defining a fault model means that a location to be tested according to fault and test information for discovery and recovery of fault are suitably defined.

Figure 2:
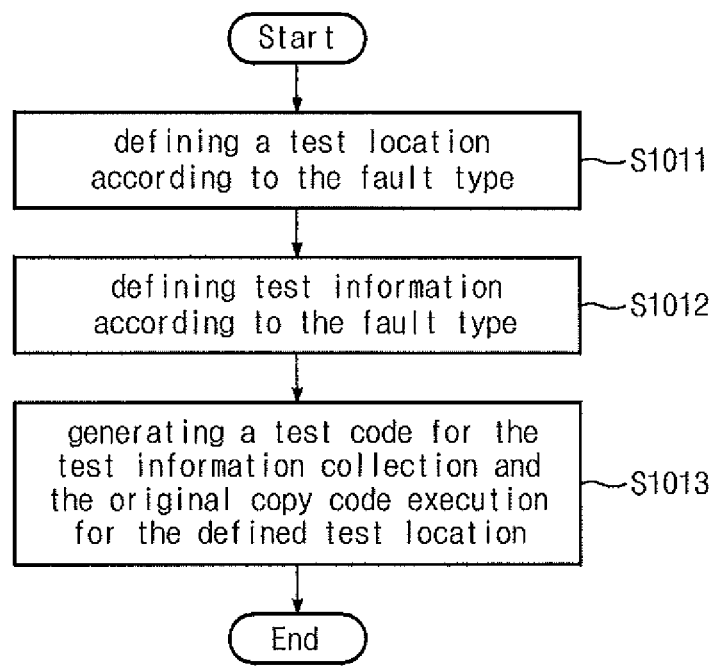
FIG. 2 is a flowchart showing the detailed process of defining a fault model in the operational system test method according to an exemplary embodiment of the present invention.

FIG. 2 is a flowchart showing the detailed process of defining the fault model in the operational system test method of the present invention according to further embodiments.

In an embodiment, and referring to FIG. 2, the operational system test method suitably defines a test location according to the fault type (S1011).

The operational system test method defines test information according to the fault type (S1012).

In further embodiments, the operational system test method suitably generates a test code for the test information collection and the original copy code execution with respect to the defined test location (S1013).

In further exemplary embodiments according to the present invention, the process of defining the fault model of the operational system test method of the present invention is terminated. After the fault model is suitably defined, a test agent is suitably inserted (S102).

Accordingly, in further embodiments, inserting a test agent means that the test agent which performs the test location hooking and the test information collection is suitably inserted (penetrated) to all processes operating in online.

Figure 3:
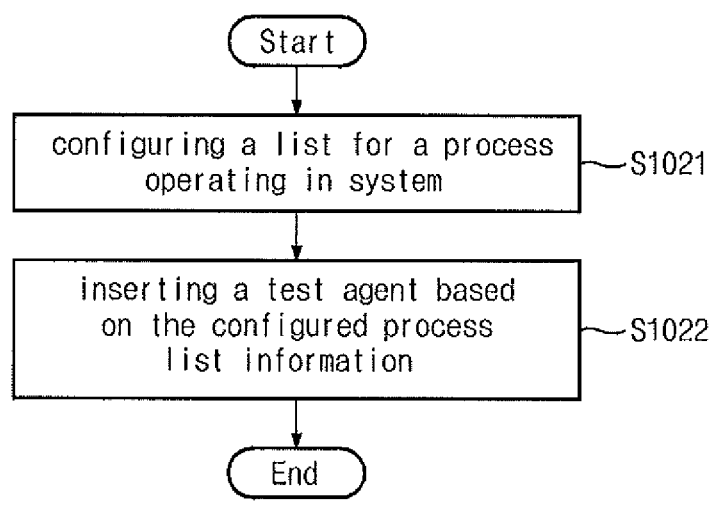
FIG. 3 is a flowchart showing the detailed process of inserting a test agent in the operational system test method according to an exemplary embodiment of the present invention.

FIG. 3 is a flowchart showing the detailed process of inserting a test agent in the operational system test method according to an embodiment of the present invention.

In an embodiment, and referring to FIG. 3, the operational system test method configures a list for a process which is operating in system (S1021). The operational system test method suitably inserts a test agent based on the configured process list information (S1022).

Accordingly, in further embodiments, the process of inserting the test agent of the operational system test method of the present invention is terminated.

Preferably, after the test agent is inserted, the operational system test method suitably hooks a test location (S103).

Preferably, hooking a test location refers to that it hooks the process control block (PCB) of OS so that the test code including the operation of the original copy code be executed, when the inserted test agent passes by the place defined as the test location.

Figure 4:
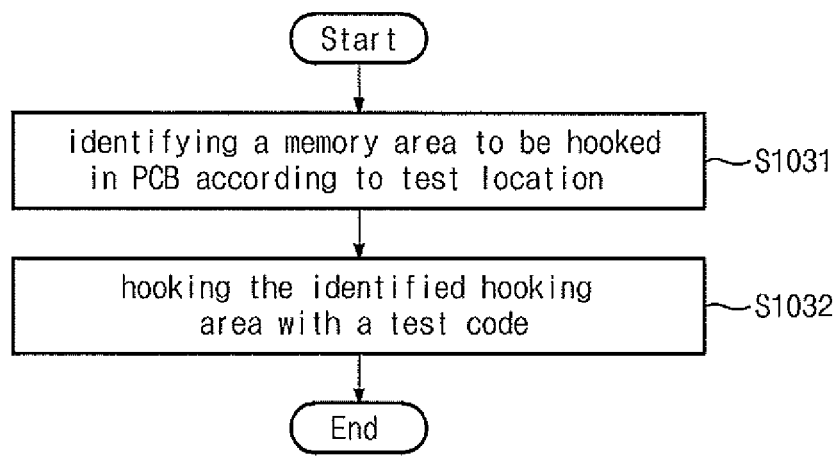
FIG. 4 is a flowchart showing the detailed process of hooking the test location in the operational system test method according to an exemplary embodiment of the present invention.

FIG. 4 is a flowchart showing the detailed process of hooking the test location in the operational system test method according to further embodiments of the present invention.

In an embodiment, and referring to FIG. 4, the operational system test method identifies a memory area to be hooked in PCB according to test location (S1031).

Preferably, after the memory area is identified, i) if the test location is the SYSTEM Application Process Interface (API) function, the APISet of PCB is suitably identified as a hooking area. ii) if the test location is the Dynamic Linking Library (DLL) EXPORT function, the Import Address Table (IAT) of PCB is suitably identified as a hooking area. iii) In other cases, the code space of PCB is suitably identified as a hooking area.

Accordingly, in further embodiments, the operational system test method hooks the identified hooking area with a test code (S1032).

The process of hooking the test location of the operational system test method of the present invention is terminated.

In further embodiments, after the test location is hooked, the operational system test method suitably collects test information (S104). According to embodiments of the present invention, collecting test information is meant to refer to collecting the information for test, when system executes the hooked location for the purpose of test.

Figure 5:
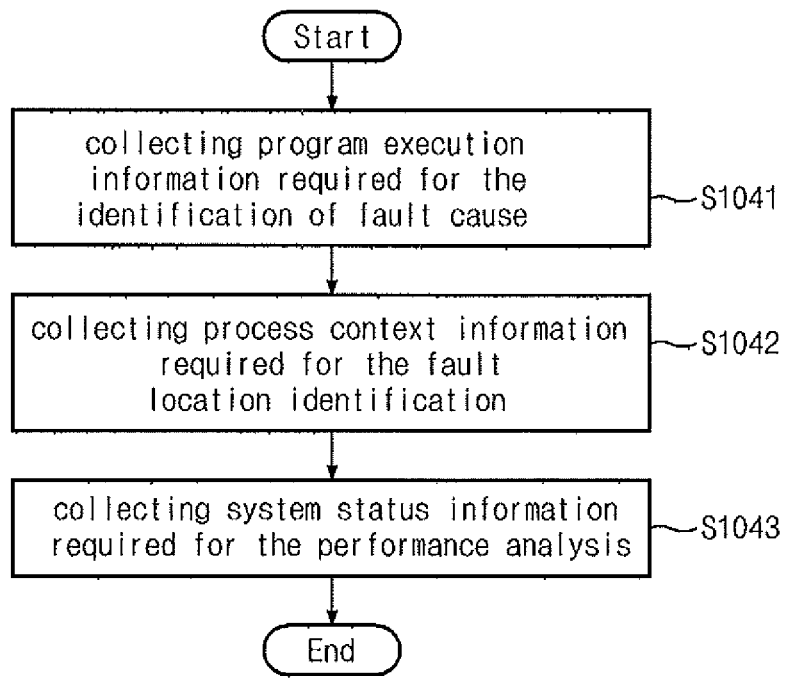
FIG. 5 is a flowchart showing the detailed process of collecting test information in the operational system test method according to an exemplary embodiment of the present invention.

FIG. 5 is a flowchart showing the detailed process of collecting test information in the operational system test method according to embodiments of the present invention.

In an embodiment, and referring to FIG. 5, the operational system test method collects program execution information of PCB required for the identification of fault cause (S1041).

The operational system test method collects process context information of PCB required for the fault location identification (S1042).

The process of collecting the test information of the operational system test method of the present invention is terminated.

In another further embodiment, after the test information is collected, the operational system test method removes the test agent (S105).

According to embodiments of the present invention, removing the test agent is meant to refer to that the location hooked for the purpose of test is restored to the original copy code and the test agent is removed.

Figure 6:
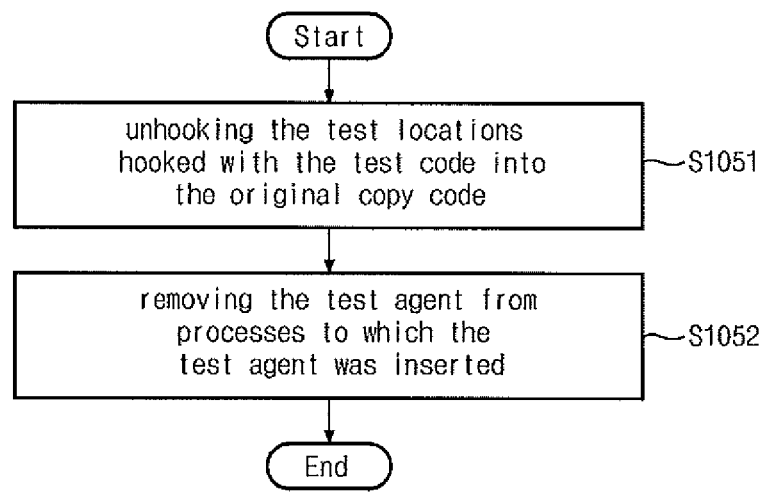
FIG. 6 is a flowchart showing the detailed process of removing the test agent in the operational system test method according to an exemplary embodiment of the present invention.

FIG. 6 is a flowchart showing the detailed process of removing the test agent in the operational system test method according to further exemplary embodiments of the present invention.

In an embodiment, and referring to FIG. 6, the operational system test method unhooks the test locations which are hooked with the test code into the original copy code (S1051). The operational system test method removes the test agent from processes to which the test agent was inserted (S1052). The process of removing the test agent of the operational system test method is terminated.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An operational system test method, comprising:
defining a fault model;
inserting a test agent based on program context information of process control block (PCB);
hooking a test location by hooking the PCB of operating system (OS), when the inserted test agent passes by a place defined as the test location;

collecting test information; and
removing the test agent.

2. The method of claim 1, wherein defining a fault model comprises:
   defining the test location according to a fault type;
   defining the test information according to the fault type; and
   generating a test code for collecting the test information.

3. The method of claim 2, wherein inserting a test agent comprises:
   configuring a list for a process which is operating; and
   inserting the test agent based on the list.

4. The method of claim 3, wherein hooking a test location comprises:
   identifying a memory area according to the test location; and
   hooking the identified memory area with the test code.

5. The method of claim 4, wherein collecting test information comprises collecting program execution information, process context information and system status information.

6. The method of claim 5, wherein removing the test agent comprises:
   restoring the test location; and
   removing the test agent.

7. An operational system test method, comprising:
   defining a fault model;
   inserting a test agent based on program context information from a process control block (PCB);
   identifying a memory area according to a test location;
   hooking the identified memory area by hooking the PCB of an operating system, when the inserted test agent passes by a place defined as the test location;
   collecting test information; and
   removing the test agent.

8. The method of claim 7, wherein defining a fault model comprises:
   defining the test location according to a fault type;
   defining the test information according to the fault type; and
   generating a test code for collecting the test information.

9. The method of claim 8, wherein hooking the identified memory area comprises hooking the identified memory area of the PCB with the test code.

10. The method of claim 9, wherein the identified memory area comprises a function table.

11. The method of claim 10, wherein the function table comprises an APISet area and an Import Address Table (IAT).

12. The method of claim 9, wherein the identified memory area comprises a code space area of the PCB.

13. The method of claim 9, wherein the test information comprises a program execution information of the PCB and a process context information of the PCB.

* * * * *